United States Patent
Zeng et al.

(10) Patent No.: US 6,553,148 B2
(45) Date of Patent: Apr. 22, 2003

(54) JOINT CODING METHOD FOR IMAGES AND VIDEOS WITH MULTIPLE ARBITRARILY SHAPED SEGMENTS OR OBJECTS

(75) Inventors: Wenjun Zeng, Vancouver, WA (US); Jin Li, Vancouver, WA (US); Shaw-Min Lei, Camas, WA (US)

(73) Assignee: Sharp Laboratories of America, Camas, WA (US)

( * ) Notice: Subject to any disclaimer, the term of this patent is extended or adjusted under 35 U.S.C. 154(b) by 11 days.

(21) Appl. No.: 09/862,399

(22) Filed: May 21, 2001

(65) Prior Publication Data

US 2002/0003906 A1 Jan. 10, 2002

Related U.S. Application Data

(63) Continuation of application No. 09/158,659, filed on Sep. 22, 1998, now Pat. No. 6,236,757.
(60) Provisional application No. 60/090,084, filed on Jun. 18, 1998.

(51) Int. Cl.[7] .................................................. G06K 9/36
(52) U.S. Cl. ....................................................... 382/240
(58) Field of Search ................................. 382/232, 240, 382/244, 247, 248, 233; 348/384.1, 394.1, 395.1, 398.1, 400.1–404.1, 407.1–416.1, 420.1, 421.1, 425.2, 430.1, 431.1; 358/432, 433; 375/240.23, 240.24; 341/51, 63, 65, 67, 107; 364/724.011, 724.04, 724.05, 724.13, 724.14, 725.01, 725.02

(56) References Cited

U.S. PATENT DOCUMENTS

| | | | | |
|---|---|---|---|---|
| 5,592,228 A | * | 1/1997 | Dachiku et al. | 348/416 |
| 5,602,589 A | * | 2/1997 | Vishwanath et al. | 348/398 |
| 5,692,063 A | * | 11/1997 | Lee et al. | 382/107 |
| 5,748,786 A | * | 5/1998 | Zandi et al. | 382/240 |
| 5,748,789 A | * | 5/1998 | Lee et al. | 382/243 |
| 5,815,097 A | * | 9/1998 | Schwartz et al. | 341/51 |
| 5,867,602 A | * | 2/1999 | Zandi et al. | 382/248 |
| 5,881,176 A | * | 3/1999 | Keith et al. | 382/248 |
| 5,966,465 A | * | 10/1999 | Keith et al. | 382/232 |
| 6,141,446 A | * | 10/2000 | Boliek et al. | 382/233 |
| 6,236,757 B1 | * | 5/2001 | Zeng et al. | 382/240 |

OTHER PUBLICATIONS

Minami et al., "3–D Wavelet Coding of Video with Arbitrary Regions of Support", Signals, Systems and Computers, 1999, Conference Record of the Thirty–Third Asimolar Conference on, vol. 2, 1999, pp. 1422–1425 vol. 2.*

Primary Examiner—Jose L. Couso
(74) Attorney, Agent, or Firm—Marger Johnson & McCollom

(57) ABSTRACT

An adaptive image coding method and system are disclosed. The system accepts an input image, divides it into image segments, and assigns each segment to a wavelet transform filter from a bank of such filters for transformation. The bank preferably comprises filters adapted for different types of image content, e.g., sharp edges, slowly-varying contours, etc. Filters are preferably assigned so as to produce minimal distortion for their assigned image segments at a given target bit rate, each filter produces transform coefficients for its segment using scale and subband settings common to the entire image. The valid coefficients for each segment are then combined in a composite wavelet coefficient image, which resembles a single wavelet transform of an entire image—although different filters are used to create different portions of the coefficient image. The composite image allows joint, rate-distortion optimized coding for a segmented image. Joint coding allocates bits between the transforms of the image segments optimally, and produces an easily scaleable bitstream.

19 Claims, 6 Drawing Sheets

OTHER PUBLICATIONS

M. Antonini, M. Barlaud, P. Mathieu and I. Daubechies, "Image Coding Using Vector Quantization In The Wavelet Transform Domain," IEEE 1990, pp. 2297–2300.

Tsuhan Chen, Cassandra T. Swain and Barry G. Haskell, "An Approach To Region Coding For Content–Based Scalable Video," IEEE International Conference on Image Processing, 1996 (ICIP '96), pp. 1–4.

Kannan Ramchandran, Zixiang Xiong, Kohtaro Asai and Martin Vetterli, "Adaptive Transforms For Image Coding Using Spatially Varying Wavelet Packets," IEEE Trans. Image Processing, Jul. 1996, pp. 1197–1204.

Emmanuel Reusens, Touradj Ebrahimi, Corinne Le Buhan, Roberto Castagno, Vincent Vaerman, Laurent Piron, Carmen de Sola Fabregas, Sushil Bhattacharjee, Frank Bossen and Murat Kunt, "Dynamic Approach To Visual Data Compression," IEEE Trans. Circuits and Systems for Video Technology, Feb. 1997, pp. 197–211.

Limin Wang and Andre Vincent, "Joint Coding For Multi–Program Transmission," ICIP 1996, pp. 1–4.

Wenjun Zeng, Jin Li and Shawmin Lei, "Adaptive Wavelet Transforms With Spatially Varying Filters For Scalable Image Coding," pp. 1–5.

* cited by examiner

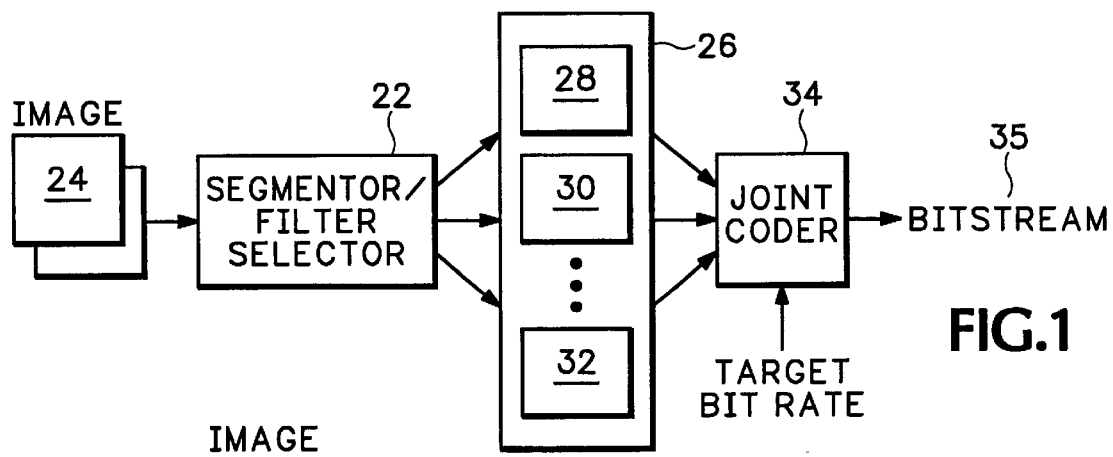
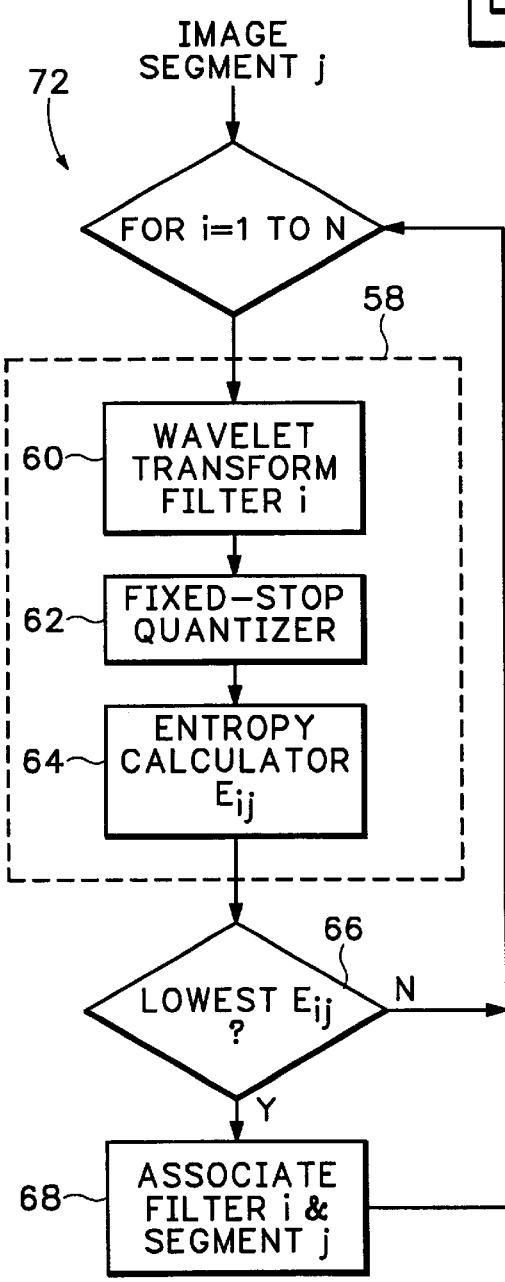
FIG.4
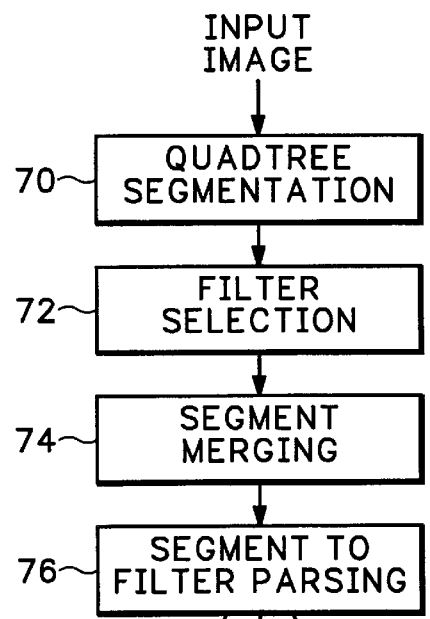
FIG.5

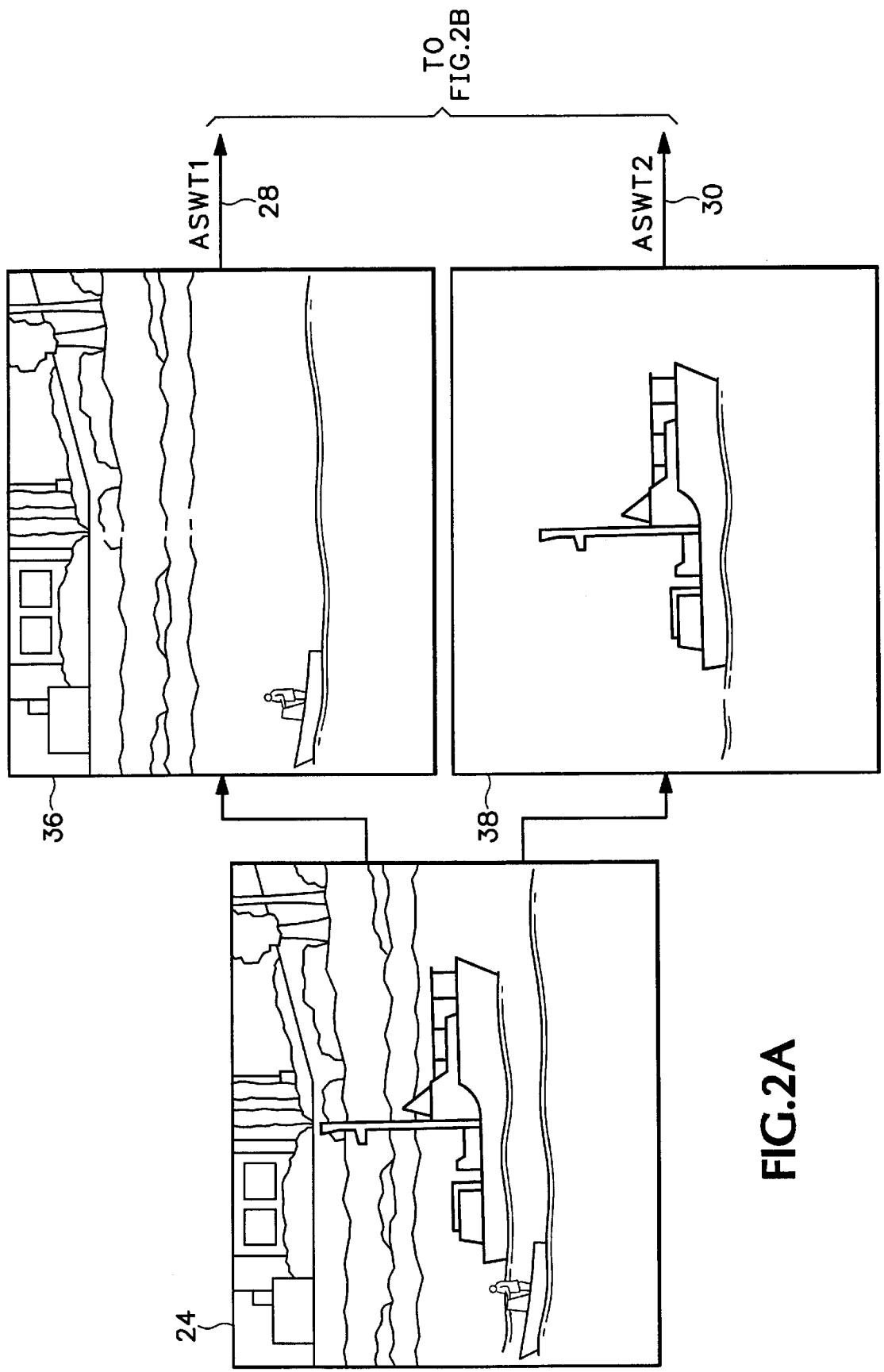

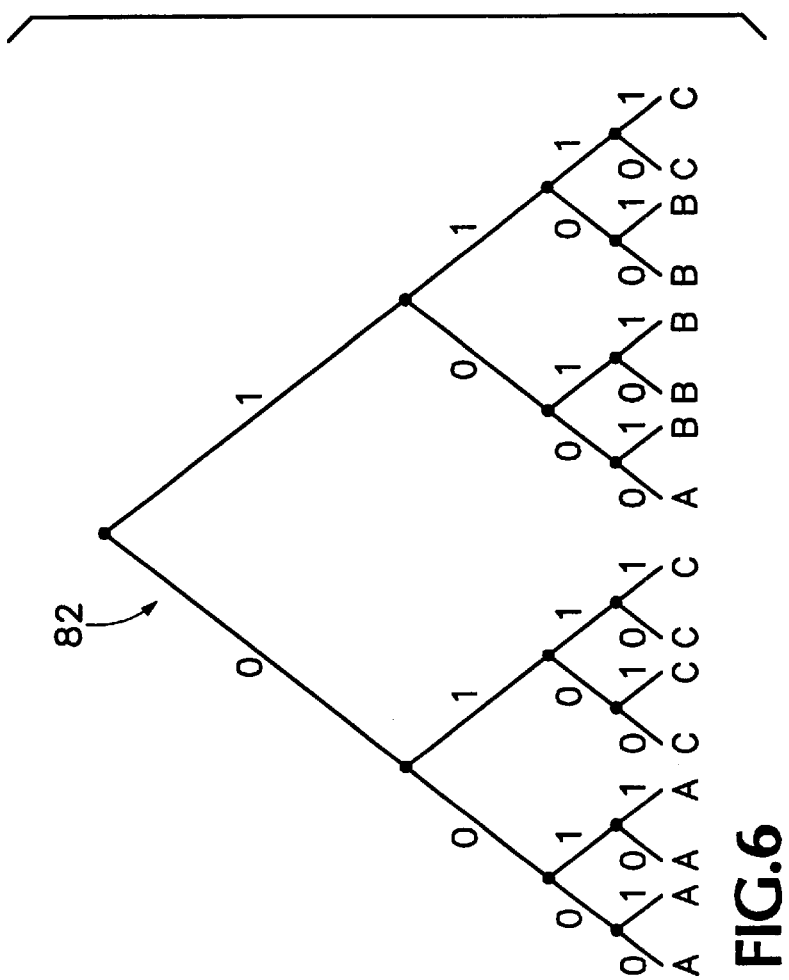

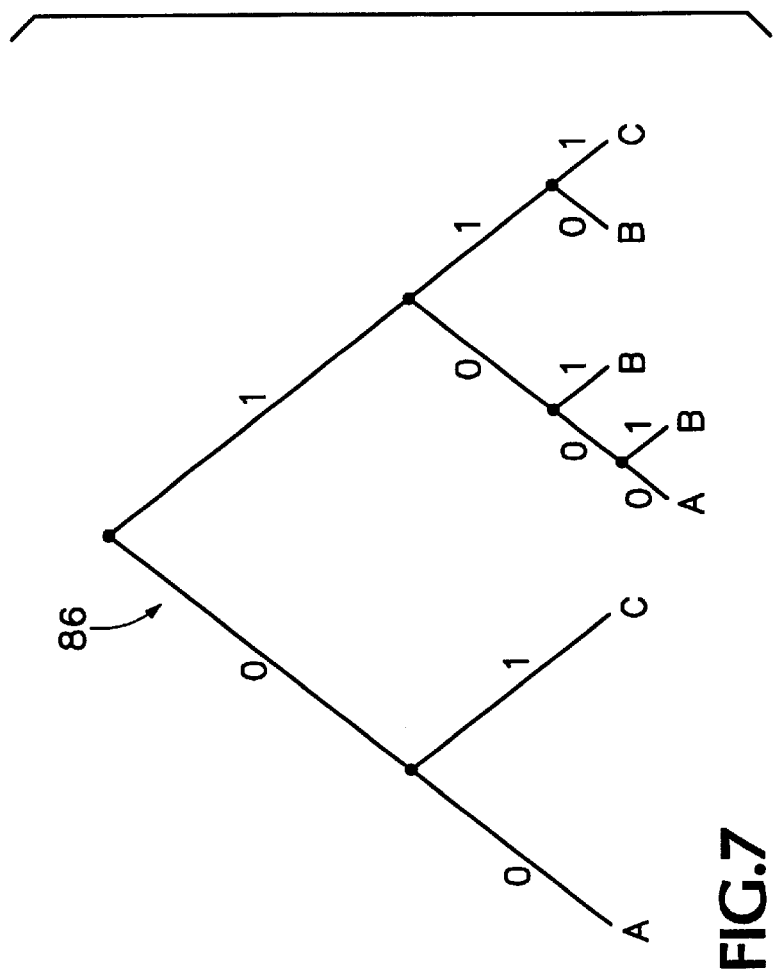
FIG. 7
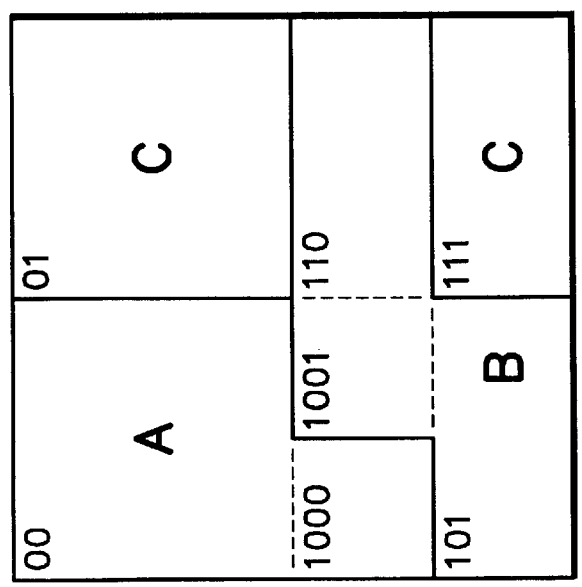

JOINT CODING METHOD FOR IMAGES AND VIDEOS WITH MULTIPLE ARBITRARILY SHAPED SEGMENTS OR OBJECTS

This application is a continuation of U.S. Application Ser. No. 09/158,659, filed Sep. 22, 1998, now U.S. Pat. No. 6,236,757, which claims the benefit of Provisional application Ser. No. 60/090,084, filed Jun. 18, 1998.

FIELD OF THE INVENTION

This invention pertains generally to methods and systems for compression of digital images, and more particularly to coding of a segmented image using multiple wavelet transforms.

BACKGROUND OF THE INVENTION

Conventional digital images represent a visual scene using a relatively large amount of data. Visual scenes are usually digitized in a pixel grid of rows and columns, with each pixel allocated a fixed number of bits to represent gray shade or color. For example, a typical personal computer screen can display an image 1024 pixels wide, 768 pixels high, with 16 bits allocated for each pixel to display color—a single such image requires over 12.5 million bits of storage. If this same screen were used to display digital video at 60 frames per second, the video would require a data rate of 755 million bits per second—roughly the combined data rate of 12,000 conventional telephone conversations. Digital image technology now extends, and will continue to be extended, into applications where data volumes such as those exemplified above are undesirable, and in many instances, unworkable.

Most digital images must be compressed in order to meet transmission bandwidth and/or storage requirements. Lossless image coders generally seek out redundancies in image data (e.g., spatial, intensity, or temporal correlation) that can be coded more efficiently without loss of information content. Compression gains with lossless coders are generally modest. Lossy coders throw away part of the full precision image data during compression. Although many lossy image coders can produce images and videos compressed to only a fraction of a bit per pixel, the quality of a reconstructed lossy-compressed image at a given compression rate may vary greatly from coder to coder.

Some lossy coders transform an image before compressing it. The transform step in a coder (hopefully) allows the coder to better rank the significance of image information content. The transform coder then keeps only what it determines to be more significant transformed image information, and discards the remainder. An inverse transform later reconstructs the image from the partial transform data.

Different transforms parse image information in different ways. A discrete cosine transform (DCT) represents an image in terms of its sinusoidal spatial frequency. A discrete wavelet transform (DWT) represents an image using coefficients representing a combination of spatial location and spatial frequency. Furthermore, how well a DWT parses location and frequency information on a given image depends on the particular wavelet function employed by the DWT. For instance, the Haar wavelet function efficiently codes text and graphics regions, while the 9-7 tap Daubechies wavelet function performs well for coding natural images.

SUMMARY OF THE INVENTION

A "best" wavelet transform coder can generally be selected from a set of coders for any image, given some measurable quality criteria. It has now been found that this concept can be extended to subregions of an image. The present invention is directed to transform coders capable of processing multiple image subregions, each with a different transform function. Preferably, such transform coders have the capability to process arbitrary-shaped image subregions. For purposes of this disclosure, an image subregion is synonymous with an image "segment".

Prior subregion coders are limited by several constraints that the present invention seeks to overcome. First, existing subregion coders require that each image subregion form a rectangle. Second, prior subregion coders code each subregion separately. Third, prior subregion coders do not lend themselves well to embedded coding techniques.

The present invention utilizes the arbitrary shape wavelet transform (ASWT), which allows an image to be divided into arbitrarily-shaped subregions. The subregions are wavelet-transformed separately with a "best" wavelet filter from a finite set of filters. Then, the wavelet transforms of the image segments are combined in a coherent manner prior to coding. This combination step allows the coder to "optimally" allocate bits between subregions, each having been "optimally" transformed.

In one aspect of the present invention, a method for wavelet transform coding of a segmented digital image is disclosed. The method comprises applying a first wavelet transform filter at a given wavelet decomposition level to a first segment of an image, thereby obtaining a first set of transform coefficients. A second wavelet transform filter is applied at the same wavelet decomposition level to a second segment of an image to obtain a second set of transform coefficients. The first and second sets of transform coefficients are then merged to form a composite wavelet coefficient image. The composite wavelet coefficient image may then be coded with any conventional wavelet transform coder—implicitly, the coder will jointly allocate bits to each segment optimally, through bit allocation on the composite wavelet coefficient image. This method may be extended to include additional wavelet transform filters and finer image segmentation.

Preferably, the wavelet transform set utilizes the arbitrary shape wavelet transform (ASWT), which can process image segments in almost any shape. The present invention also allows joint bit allocation with embedded coding.

The present invention performs two types of image segmentation. In the first type, segmentation decisions are input to the process externally. In the second type, segmentation is coupled with filter assignment, such that segmentation in at least some sense tracks optimal spatial filter assignment.

In another aspect of the invention, a digital image coder is disclosed. This system comprises an image segmentor, a wavelet filter bank, a composite wavelet coefficient mapper, and, preferably, a transform coder. The image segmentor parses segments of an input image to filters from the wavelet filter bank. Each wavelet filter computes wavelet transform coefficients for its image segment. The composite wavelet coefficient mapper gathers the wavelet coefficients produced by each wavelet filter into a composite coefficient image, arranging them as if they were produced from a single wavelet transform. Finally, the transform coder codes the composite coefficient image.

BRIEF DESCRIPTION OF THE DRAWING

The invention may be best understood by reading the disclosure with reference to the following figures:

FIG. 1, which illustrates a block diagram of an image coder according to an embodiment of the present invention;

FIGS. 2A–B, which illustrate a digital image at several steps of image coding according to the present invention;

FIG. 4, which illustrates a filter selector useful with the present invention;

FIG. 5, which contains a flow chart for a joint segmentor/filter selector useful with the present invention;

FIG. 6, which illustrates a quadtree-segmented image prior to leaf node merging, and its corresponding quadtree structure; and FIG. 7, which shows the same quadtree-segmented image after leaf node merging, and its corresponding quadtree structure.

DETAILED DESCRIPTION OF THE PREFERRED EMBODIMENTS

Figure 2B:
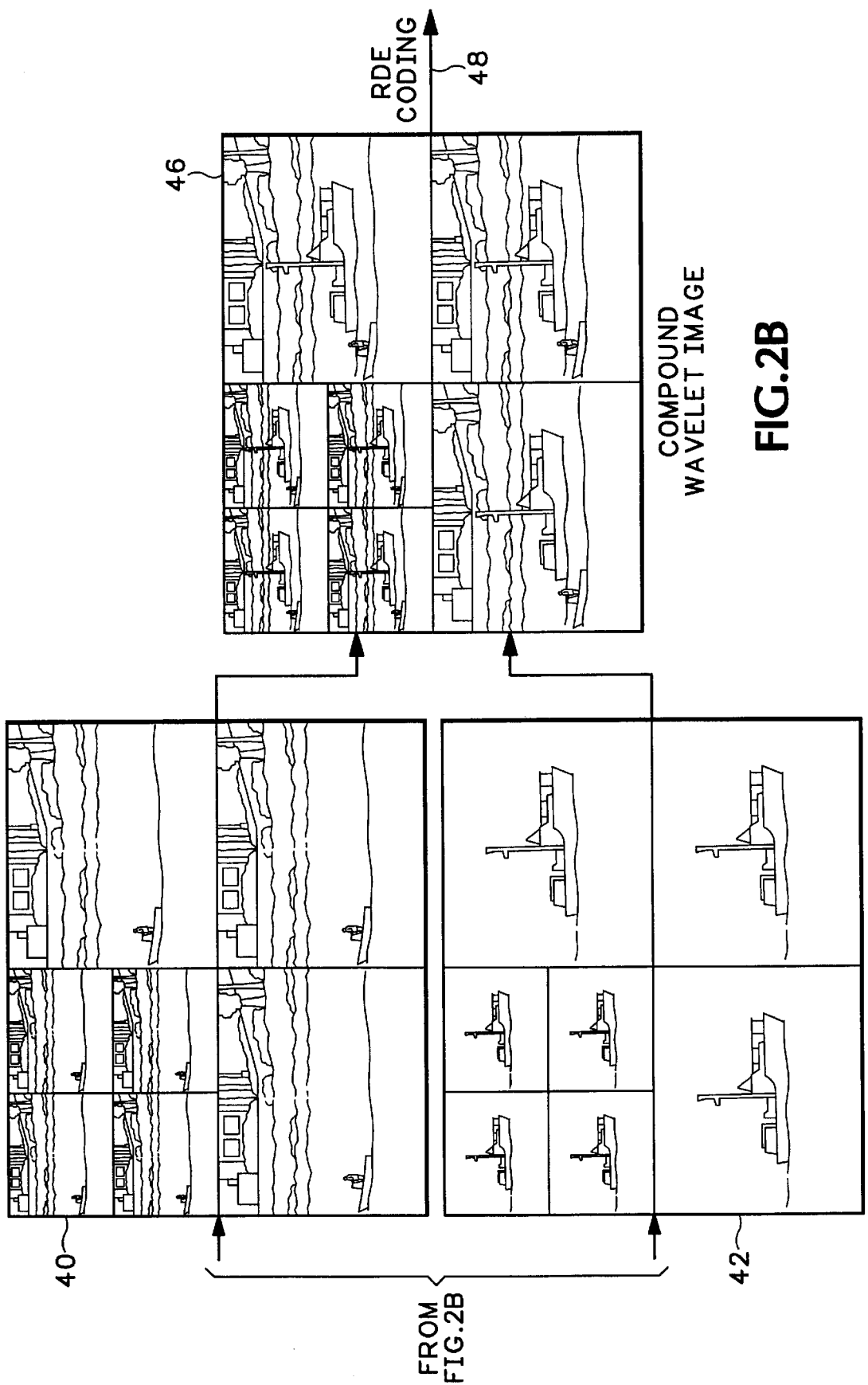

The block diagram of FIG. 1 illustrates the major functional blocks comprehended by the present invention. A segmentor/filter selector 22 accepts a digital image 24 and parses segments of image 24 to wavelet transform filters (e.g. 28, 30, 32) in a filter bank 26. Using a common wavelet decomposition level setting, each filter in filter bank 26 performs a wavelet transform on segments of image 24 assigned to it. The wavelet coefficients produced by filters 28, 30, 32 are fed to joint embedded coder 34, where a wavelet coefficient mapper combines the wavelet coefficients into a composite wavelet coefficient image. Embedded coder 34 outputs a bitstream based on the composite wavelet coefficient image.

FIG. 2 presents an image proceeding through the coding process pictorially. Digital image 24 is segmented, producing background segment 36 and coast guard cutter segment 38. Background segment 36 is fed to a first arbitrary shape wavelet transform filter 28, which outputs a background wavelet coefficient map 40. Cutter segment 38 is fed to a second arbitrary shape wavelet transform filter 30, which outputs a cutter wavelet coefficient map 42. Coefficient maps 40 and 42 register transform coefficients using a common scale and subband structure corresponding to the original image format (e.g., rectangular as in FIG. 2). This allows a coefficient mapper to merge coefficient maps 40 and 42 into a composite coefficient image 46. Composite coefficient image 46 has the scale and subband structure of a conventional rectangular single wavelet transform of digital image 24; thus coefficient image 46 may be coded directly using rectangular wavelet coefficient image coders, such as rate-distortion embedded coder 48.

The coding process illustrated by FIGS. 1 and 2 activates different wavelet transforms for arbitrarily-shaped image segments 36 and 38. Proper filter selection for each segment can reduce the entropy of the wavelet coefficients as compared to the entropy of the wavelet coefficients where the entire image 24 is transformed by a single filter. An entropy-estimation filter selection method, described in a separate section below, enhances performance of the invention.

A distinct separate advantage of the invention is the ability to jointly code the transform coefficients of segments 36 and 38. Coefficient maps 40 and 42 could theoretically be separately, and optimally, coded, as long as the decoder knows the segmentation boundaries of image 24. For compression, a target bit rate could be supplied to two coders, one for each coefficient map 40 and 42. However, if the rate-distortion curves for maps 40 and 42 differ, as they generally will, coding each map at a common target bit rate will produce an inferior result compared to joint coding.

Figure 3:
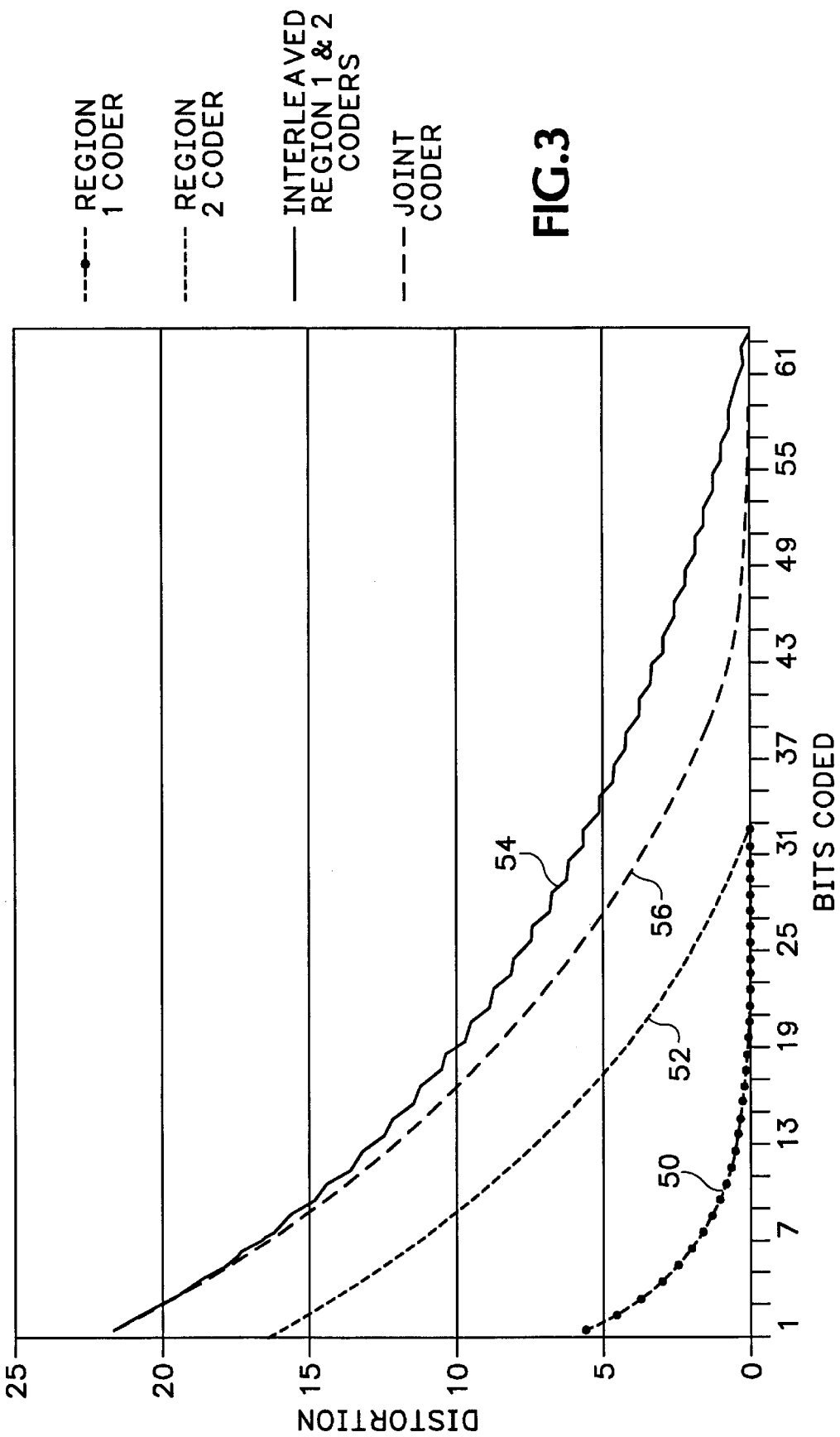
FIG. 3, which plots distortion as a function of bits coded for a hypothetical two-region image.

FIG. 3 graphs rate-distortion curves for two hypothetical regions, each originally represented by 32 bits. Region 1 is represented by curve 50, and region 2 is represented by curve 52. Each region may theoretically be coded in a rate-distortion optimal manner that follows, respectively, curves 50 and 52. Rate distortion curve 54 represents the combined 64-bit output bit sequence of the two coders, assuming the two coders alternate in outputting bits. Even though each coder operates optimally for its region, the combined output of the two coders is suboptimal for virtually all target bit rates if available bits are evenly divided between the two regions.

The present invention allows joint coding because a consistent scale and subband coefficient structure is produced by each filter in wavelet filter bank 26. This attribute allows a coefficient mapper to merge wavelet coefficients for two or more regions and perform a joint coding on the merged coefficients. For instance, curve 56 of FIG. 3 represents rate distortion after merging of the regions represented by curves 50 and 52. A joint coder can operate on the merged coefficients in a rate-distortion optimal manner that will follow curve 56, beating the performance of two region coders operating at the same aggregate bit rate. Although two coders may beat curve 54 at a given target bit rate by allocating bits non-uniformly, the joint coder solves the bit allocation problem implicitly.

Segmentation and Filter Selection

Two general segmentor/filter selector embodiments are envisioned by the present invention. The first embodiment segments an input image according to supplied instructions, and selects a wavelet transform filter for each identified segment. FIG. 2 illustrates the operation of this embodiment, where a segmentation mask of the coast guard cutter was supplied to the segmentor/filter selector. The second embodiment accepts an input image and performs segmentation and filter selection jointly; i.e., an initial segmentation is refined using filter selection results.

A flow chart for an estimated entropy based filter selector 72 useful with either embodiment appears in FIG. 4. Filter selector 72 chooses a wavelet transform filter from N available filters for each image segment j using entropy estimator 58. For a given filter i and segment j, estimator 58 determines an estimated entropy $\hat{E}_{ij}$. Decision block 66 compares values of $\hat{E}_{ij}$ for each filter, and signals block 68 to associate the current filter i with the current segment j if $\hat{E}_{ij}$ is the lowest entropy value yet received for segment j. After looping through N filters, segment j will be associated with the filter i producing the lowest estimated entropy $\hat{E}_{ij}$. This association is then used to parse image segments to the wavelet transform filters.

The present invention recognizes that for image compression applications, filter selection results are rate-sensitive. FIG. 4 shows an entropy estimator 58 developed for use with the present invention that incorporates rate sensitivity into filter selection. In block 60, image segment j is wavelet decomposed to a preset depth using each filter from the candidate set of N filters. Block 62 uniformly quantizes each wavelet decomposition using a fixed rate-matched quantizer step size, e.g., based on an average target bit rate or average distortion desired. Block 64 then calculates the first order entropy of the quantized coefficients to produce the estimated entropy value $\hat{E}_{ij}$.

In many systems using the present invention, the purpose of image segmentation is to allow more efficient image coding. The joint segmentation/filter selection flowchart of FIG. 5 illustrates one preferred method of segmentation/filter selection. Block 70 performs an initial fixed segmentation of an input image—for simplicity, quadtree segmentation may be used at this step. Block 72 performs filter selection, e.g., as shown in FIG. 4, on each segment identified by block 70. Neighboring segments associated with the same filter are then merged into larger segments in block 74. Block 76 then parses segments to their associated filters for decomposition.

Referring now to FIGS. 6 and 7, an illustration of joint segmentor/filter selector operation is presented. In FIG. 6, block 80 represents an input image that has been initially segmented into 16 equally-sized subregions (numbered 0000 through 1111 binary) by a quadtree segmentor. Quadtree 82 shows the relationship of the segments in the quadtree mapping of segmented image 80.

Wavelet filters A, B, and C are applied to each subregion 0000–1111, and a best filter is chosen for each subregion based on entropy estimation. A sample filter assignment is shown on 80 by the placement of "A", "B", or "C" on the subregion to show the assigned filter. The leaf nodes on quadtree 82 are also labeled with the selected filter for that node.

After all leaf subregions have been assigned a filter type A, B, or C, the tree is merged from the bottom up recursively. If the children of a parent node are assigned the same type of filter, the children will be merged and the same type of filter will be assigned to the parent node. FIG. 7 shows the original segmentation and filter assignment of FIG. 6 after this merging process. Of the original leaf segments of quadtree 82, only segments 1000 and 1001 remain in quadtree 86. All other original leaf segments have been merged up one or two nodes due to common filter assignment. Segmentation map 84 shows the final filter assignment for this example.

Filter re-selection is not performed at intermediate nodes after merging, as it is believed that re-association is highly unlikely. The spatial quadtree structure itself is not critical to the rate-distortion optimization process—merging merely facilitates the coding of the segmentation map. The merging also reduces the number of boundaries in the segmentation map, reducing the potential for boundary artifacts which may occur at low bit rates.

In principle, the quadtree segmentation result will depend on the final target bit rate selected for entropy measurement. Using different segmentation maps for different intermediate bit rates makes it extremely difficult, if not impossible, to generate a (preferably continuously) scalable bit stream. Thus a single segmentation map is preferred to allow freedom in scalability. Given the choice between a segmentation map generated using a higher target bit rate and one generated at a lower target bit rate, the map generated with a higher target bit rate is preferred. The high target bit rate map is believed to more accurately reflect the characteristics of each region. It is also believed that perceptual quality of a low-bit rate image may be degraded if the segmentation map is generated at too low of a target bit rate.

Arbitrary-Shape Wavelet Transform

The concepts disclosed herein can be utilized with purely rectangular segmentations of an image (such as segmentation of image 80 in FIG. 6). It is preferred, however, that the wavelet transform filters not constrain the segmentation result in this manner. This can reduce boundary artifacts that may occur if an image must be processed as a set of rectangles. This also enables a system to perform coding on complex segmentations such as the coast guard cutter of FIG. 2.

In order to allow wavelet transforms of non-rectangular segments, filter bank 26 of FIG. 1 preferably utilizes arbitrary shape wavelet transform (ASWT) filters. The ASWT is described in detail in U.S. patent application Ser. No. 09/110,979, entitled "Arbitrary Shape Wavelet Transform with Phase Alignment" and filed Jul. 7, 1998, by J. Li and S. Lei, which is incorporated herein by reference: Briefly, the ASWT symmetrically extends signal pixels at segment boundaries by replicating them into adjacent pixels (not part of the segment) in reverse order, and then wavelet transforming the extended pixel image. Wavelet coefficients obtained from the transform that correspond to the original segment pixels are retained.

In order to facilitate coefficient mapping, each segment should be extended to a common size during the ASWT process (preferably the original image size). The wavelet decomposition level for each segment-ASWT combination is also set to the same value such that the ASWT-decomposed segments exhibit a common scale and subband structure.

Coefficient Mapping

Coefficient mapping combines the coefficients obtained with each segment-ASWT combination into a composite wavelet coefficient image. The common image size of all ASWT coefficient maps infers that coefficients can be copied address-by-address directly into the composite wavelet coefficient image. One ASWT coefficient map may even serve as the composite image (preferably the one representing the largest image segment), with other coefficients copied into its invalid locations.

The mapper must be able to locate the valid pixels in each coefficient map. This may be accomplished by "tagging" invalid pixels with an unused data value, or using a coefficient segment map to facilitate copying. If the original image segments are disjoint, valid pixels should not exist at the same location for two ASWT coefficient maps.

The mapping process is shown pictorially in FIG. 2. Coast guard cutter segment 38 is segmented from its background segment 36. The background segment 36 maps, using a first ASWT 28, into a first coefficient map 40. Coast guard cutter segment 38 maps, using a second ASWT 30 into a second coefficient map 42. The common scale and subband structure of maps 40 and 42, as well as the dark, mutually disjoint invalid regions of each map, are clearly visible in FIG. 2. The mapping process copies background and coast guard cutter transform coefficients into their properly registered locations in composite wavelet coefficient image 46.

Note that although composite image 46 represents scale and subband structure consistently, the composite image cannot be directly processed using an inverse wavelet transform to obtain the original image. A de-mapping, signal boundary extension, and inverse wavelet transform must be performed on each segment separately to recover the original image information.

Transform Coders

Wavelet transform images are commonly coded for transmission or storage. An advantage of the present invention is the presentation of a segmented, wavelet transformed image in a standard (e.g. rectangular) image format that is compatible with known transform coders. This advantage allows a segmented image to be jointly coded using well-developed optimal techniques for rectangular wavelet transform image coding.

One preferred coding technique that may be employed with the present invention is rate-distortion optimized embedded (RDE) coding. This technique is disclosed in U.S. patent application Ser. No. 09/016,571, "An Embedded Image Coder with Rate-Distortion Optimization", filed Jan. 30, 1998, by J. Li and S. Lei, which is incorporated herein by reference.

RDE is a rate-distortion optimized coding technique. This coder reorders the bits of a wavelet transform image into a most-important-bits-first bitstream, i.e. allocating the available coding bits first to image bits having the steepest rate-distortion slope. The rate-distortion slope for uncoded bits is predicted using only previously-coded bits—this allows both the coder and decoder to operate in lockstep without image position information from the coder.

The RDE coder processes a composite wavelet coefficient image produced using the present invention in similar fashion. Bit allocation among different image segments is thus achieved implicitly, as the RDE coder considers the rate distortion in all image segments jointly. The effect of joint rate distortion consideration is evident in FIG. 3. A joint coder operating along curve 56 out performs two interleaved optimal coders operating along curve 54 because the joint coder implicitly recognizes that one of two regions (curve 52) contains many more meaningful bits than the other region (curve 50). Curve 56 reorders bit transmission accordingly.

Test Results

Experimental results were obtained using a candidate set of three prototype wavelet filters in bank 26. The three filters chosen were the Haar filter and the 9-3 tap and 9-7 tap Daubechies biorthogonal filters. The Haar filter is the only known symmetric, orthogonal wavelet filter, and is a good choice for text and graphics image regions. The 9-7 tap Daubechies filter is the most popular filter used in the literature for coding of natural images, and generally has very good rate-distortion performance. The 9-3 tap Daubechies filter, with shorter filter length than the 9-7 tap filter, is expected to have less ringing artifacts around sharp edges at low bit rates. A five-level wavelet decomposition with symmetric boundary extension was used throughout these experiments.

For each test image, the segmentation map was generated using a filter selection target bit rate of 4 bits per pixel. This single segmentation map was then used for the adaptive wavelet transform at all tested bit rates. The depth of the initial spatial quadtree was adapted to the size of the test image; quadtree segmentation was stopped when the shorter side of each leaf block was between 32 and 64 pixels in length. To reduce the potential segment boundary effect at lower bit rates, a slightly modified version of the simple deblocking algorithm presented in S. Kim et al., "Results of Core Experiment N1", ISO/IEC JTC1/Sc29/WG11 MPEG97/M2099, Apr. 1997, was used.

Table 1 summarizes the rate-distortion performance of this experiment at several target bit rates. The adaptive segmentation and transform method with three candidate filters is compared to each of the three filters operating separately on an entire image, with each using the same backend RDE coding.

TABLE 1

| | | Coding PSNR (dB) | | | | | |
|---|---|---|---|---|---|---|---|
| | | Bit Rate (bits per pixel) | | | | | |
| Image | Filter | 0.125 | 0.25 | 0.5 | 0.75 | 1 | 2 |
| Cmpnd1 | Haar | 22.37 | 28.35 | 38.90 | 45.56 | 50.82 | 90.46 |
| (512 × 768) | 9-3 tap | 21.77 | 26.50 | 31.98 | 34.92 | 36.31 | 37.28 |
| | 9-7 tap | 22.46 | 26.69 | 32.04 | 35.07 | 36.58 | 38.14 |
| | Adaptive | 23.99 | 30.26 | 40.11 | 46.73 | 51.80 | 89.76 |

TABLE 1-continued

| | | Coding PSNR (dB) | | | | | |
|---|---|---|---|---|---|---|---|
| | | Bit Rate (bits per pixel) | | | | | |
| Image | Filter | 0.125 | 0.25 | 0.5 | 0.75 | 1 | 2 |
| Target | Haar | 19.31 | 23.15 | 30.55 | 36.54 | 41.45 | 55.12 |
| (512 × 512) | 9-3 tap | 21.56 | 26.16 | 32.16 | 37.23 | 41.12 | 48.26 |
| | 9-7tap | 22.11 | 26.54 | 33.54 | 37.89 | 42.26 | 49.15 |
| | Adaptive | 22.04 | 26.8 | 34.14 | 39.38 | 44.78 | 63.30 |
| Container | Haar | 25.21 | 28.11 | 31.73 | 34.23 | 36.31 | 42.33 |
| (352 × 288) | 9-3 tap | 25.49 | 28.38 | 32.05 | 34.74 | 36.86 | 43.44 |
| | 9-7 tap | 25.84 | 28.56 | 32.16 | 34.88 | 37.11 | 43.59 |
| | Adaptive | 25.46 | 28.41 | 32.13 | 34.88 | 37.00 | 43.49 |

All three test images were grayscale images. The image "cmpnd1" contains both text and natural image regions. The image "target" comprises graphics and charts. And the image "container" is a scene containing both natural and man-made structure.

For relatively higher bit rates, PSNR improvements of up to 2 dB for the adaptive method versus the best non-adaptive method were measured for "cmpnd1" and "target" images. At lower bit rates, PSNR was not necessarily improved by the adaptive method on all test images. This is believed to be due at least in part to the filter selection/segmentation process based on a fixed, relatively high bit rate. Despite this, visual quality for the adaptively-coded images was significantly improved throughout the test set, particularly at medium to lower bit rates. The proposed invention appears particularly applicable to compression of images exhibiting space-varying characteristics, such as compound images (e.g. graphics and natural scenes) or other images exhibiting sharp edge regions and smooth regions.

Although the preferred embodiments have been described with reference to a particular process flow, numerous variations of these embodiments fall within the scope of the present invention. The association of image segments with particular candidate wavelet filters, for instance, may use different statistics or methods from those disclosed herein without departing from the invention. It is not necessary that each filter in the filter bank be used on a segment of each input image. Likewise, several disjoint segments may be assigned the same filter. Although segments are coded jointly, bit allocation priorities may be segment-weighted, e.g., by scaling the transform coefficients for each segment before RDE or other coding. Using a coefficient segmentation map, separate bitstreams may also be created for each segment at the output of the RDE or other coder, after bit allocation and coding.

Other modifications to the disclosed embodiments will be obvious to those of ordinary skill in the art upon reading this disclosure, and are intended to fall within the scope of the invention as claimed.

What is claimed is:

1. A method for wavelet transform coding a digital image, said method comprising:
    selecting a wavelet decomposition level;
    applying a first wavelet transform filter, corresponding to a first wavelet function, to a first segment of a digital image using said wavelet decomposition level, thereby obtaining a first set of transform coefficients;
    applying a second wavelet transform filter that corresponds to a different wavelet function than the first wavelet function to a second segment of said digital image using said wavelet decomposition level, thereby obtaining a second set of transform coefficients; and merging said first and second sets of transform coefficients into a composite wavelet coefficient image.

2. The method of claim 1, wherein said merging step comprises placing coefficients from said first and second sets of transform coefficients into spatial locations on said composite wavelet coefficient image consistent with the wavelet decomposed spatial locations of their respective segment transform coefficients for the entire digital image.

3. The method of claim 1, further comprising the step of compressing said composite wavelet coefficient image using a lossless compressor.

4. The method of claim 1, further comprising the step of compressing said composite wavelet coefficient image using a lossy compressor.

5. The method of claim 4, wherein said lossy compressor comprises an embedded coder operating at a target bit rate lower than the original bit rate of the digital image.

6. The method of claim 1, further comprising the step of rearranging the bits of said composite wavelet coefficient image for transmission or storage using a rate-distortion optimized embedded coder.

7. The method of claim 1, wherein said first and second wavelet transform filters accept arbitrary-shaped image segments.

8. The method of claim 1, further comprising the step of selecting said first wavelet transform filter from among a set of candidate wavelet transform filters for application to said first segment of said digital image based on measured characteristics of said first segment.

9. A method for wavelet transform coding a digital image, said method comprising:

accepting a digital image and a segmentation map of said digital image, said segmentation map grouping pixels of said digital image into multiple contiguous segments;

associating an arbitrary shape wavelet transform filter from a set of candidate filters with each of said contiguous segments, wherein at least two of said contiguous segments are associated with different filters from said set of candidate filters, and wherein each filter in the set of candidate filters corresponds to a different wavelet function than the other filters in the set correspond to;

wavelet transforming each contiguous segment using a common decomposition level and the segment's associated arbitrary shape wavelet transform filter, thereby obtaining a set of transform coefficients for each contiguous segment; and merging each set of transform coefficients into a composite wavelet coefficient image.

10. The method of claim 9, wherein said merging step comprises placing coefficients from each set of transform coefficients into spatial locations on said composite wavelet coefficient image consistent with the wavelet decomposed spatial locations of their respective segment transform coefficients for the entire digital image.

11. The method of claim 9, wherein said associating step comprises estimating the entropy of coding each of said contiguous segments with each filter from said set of candidate filters, and selecting, for each of said contiguous segments, a filter from said set of candidate filters that produces the minimum estimated entropy for that segment.

12. A digital image coder, said coder comprising:

a segmentor for parsing a digital image into multiple image segments;

a bank of wavelet transform filters, each of said filters producing a set of wavelet transform coefficients for one or more image segments associated with that filter by said segmentor, each filter in the bank of filters corresponding to a different wavelet function than the other filters in the bank correspond to; and a composite wavelet coefficient mapper that combines sets of wavelet transform coefficients produced by said bank of wavelet transform filters for said digital image into a common wavelet coefficient image.

13. The image coder of claim 12, wherein said bank of wavelet transform filters is comprised of arbitrary-shaped wavelet transform filters.

14. The image coder of claim 12, further comprising an embedded coder that operates on a common wavelet coefficient image produced by said composite wavelet coefficient mapper.

15. The image coder of claim 14, wherein said embedded coder selects an output bit order for a common wavelet coefficient image using a rate-distortion optimization criteria.

16. The image coder of claim 12, wherein said segmentor parses the digital image according to segment boundary information supplied to said coder.

17. The image coder of claim 12, wherein said segmentor comprises a filter selector, said filter selector pairing each segment of a digital image with a filter from said bank of arbitrary-shape wavelet transform filters based on measured characteristics of that segment.

18. The image coder of claim 17, wherein said filter selector comprises an entropy estimator that estimates a transform entropy value for each combination of image segment and filter from said bank of arbitrary-shape wavelet transform filters, and wherein said filter selector pairs each segment of a digital image with the filter from said bank of arbitrary-shape wavelet transform filters producing the minimum estimated entropy for that segment.

19. A digital image coder, said coder comprising:

a segmentor for parsing a digital image into multiple arbitrarily-shaped image segments;

a bank of arbitrary-shape wavelet transform filters, each of said filters producing a set of wavelet transform coefficients for one or more image segments associated with that filter by said segmentor, each filter in the bank of filters corresponding to a different wavelet function than the other filters in the bank correspond to;

a composite wavelet coefficient mapper that combines sets of wavelet transform coefficients produced by said bank of wavelet transform filters for said digital image into a common wavelet coefficient image; and a rate-distortion optimizing embedded coder that operates on a common wavelet coefficient image produced by said composite wavelet coefficient mapper to produce a scaleable output bitstream.

* * * * *